United States Patent [19]

Barger

[11] E Patent Number: Re. 31,913

[45] Reissued Date of Patent: Jun. 11, 1985

[54] APPARATUS FOR THE CONTINUOUS EXTRACTION OF OILS AND SOLUBLE SUBSTANCES FROM SOLID MATERIALS

[75] Inventor: William M. Barger, Piqua, Ohio

[73] Assignee: The French Oil Mill Machinery Company, Piqua, Ohio

[21] Appl. No.: 574,802

[22] Filed: Jan. 30, 1984

Related U.S. Patent Documents

Reissue of:

[64] Patent No.: 4,313,912
Issued: Feb. 2, 1982
Appl. No.: 195,577
Filed: Oct. 8, 1980

[51] Int. Cl.[3] ..... B01D 11/02

[52] U.S. Cl. ..... 422/267; 196/14.52; 422/269; 422/275; 422/281

[58] Field of Search ..... 422/267, 269, 272, 273, 422/275, 278, 281; 196/14.52; 127/6, 7

[56] References Cited

U.S. PATENT DOCUMENTS 3,021,201 2/1962 Upton ..... 422/278
3,131,202 4/1964 Depmer ..... 260/412.8
3,533,837 10/1970 Strich ..... 422/269
3,860,395 1/1975 Kehje et al. ..... 422/278

*Primary Examiner*—Peter Kratz
*Attorney, Agent, or Firm*—Biebel, French & Nauman

[57] ABSTRACT

A cylindrical housing encloses a plurality of vertically stacked extractor sections each containing a plurality of baskets in vertical registry with baskets of the other sections, with the baskets all being stationary so that material to be processed passes in a vertical path down through each successive extractor section. Rotating screens and miscella collection pans are disposed beneath the baskets in each extractor section and form the bottom thereof, with the screens and pans having aligned openings which during rotation permit the material being processed to be passed from an upper basket to a lower basket in vertical registry therewith. A countercurrent flow miscella and solvent distribution and collection system supplies miscella or fresh solvent to the upper portion of each of the extractor sections above the baskets and rotates with the screen and collection pan to progressively apply the proper strength of miscella or solvent to each of the baskets in each of the extractor sections.

8 Claims, 8 Drawing Figures

APPARATUS FOR THE CONTINUOUS EXTRACTION OF OILS AND SOLUBLE SUBSTANCES FROM SOLID MATERIALS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to process and apparatus for the continuous extraction of oils and soluble substances from solid materials through the use of solvents and, more particularly, to the use of a multi-stage extraction system in which extraction of the oils, etc. is accomplished while the material is moved from one station to another during processing.

2. Prior Art

In the past, in order to increase the volume of material to be processed in solvent extraction equipment, which became necessary due to the ability of other equipment in the total processing system to handle greater volumes of processed material, it was necessary to increase the diameter of the cylindrical extractors since they were only single-stage extractors in which a plurality of baskets were disposed within a cylindrical housing in a circular pattern. This was acceptable until the diameters of the extractors became so large that they could not conveniently be shipped from the site of fabrication to the plant location where they would be utilized. This resulted in the necessity of some of the extractors being fabricated on site which was both costly and inconvenient.

This initial difficulty was substantially overcome by the introduction of multiple-stage cylindrical extractors such as are commonly referred to as the carousel-type extractor as illustrated, for example, by Depmer U.S. Pat. No. 3,131,202. In this type of extraction device a plurality of stages of extractors, each essentially identical to the prior art single-stage extractor, are stacked upon one another. The baskets in each section are then rotated through almost 360° and then dumped into the subsequent baskets beneath, in sequence, and these are then again rotated so that the varying strengths of miscella and solvent can be applied to the baskets. In this manner, a higher volume of material can be processed merely by adding an additional stage to the extractor without increasing its diameter, which thus permits the extractors to be manufactured and shipped more easily.

Unfortunately, because of the substantial weight of the baskets containing the large volumes of material being processed, a substantial amount of energy is utilized to rotate these baskets.

SUMMARY OF THE INVENTION

The present invention overcomes the above described difficulties and disadvantages associated with prior art devices as well as many other problems, by providing a multiple-stage vertical solvent extraction apparatus in which the material being processed remains stationary in the baskets in each stage and is then subsequently dumped in a vertical path into each subsequent lower stage so that it is not necessary to rotate the baskets containing the processed material and thus, substantial power savings occur. This is accomplished by the use of a rotating screen which forms the basket bottoms in each section, along with the use of a rotating miscella collection pan and miscella distribution system which rotates above the baskets in each stage to supply varying strengths of miscella to the material being processed in each of the stationary baskets. An opening in each of the screens and the collection pan provides a through path for the material being processed to a subsequent stage so that each basket in a stage is sequentially dumped into the subsequent stage basket vertically beneath it after it has been treated with solvent and miscella which has been collected in the respective collection pan.

In the process of the present invention, material from which the oils or other soluble substances are to be extracted are first placed in a plurality first stage stationary baskets. Miscella is then introduced into each of the baskets and passes downwardly through the material to enhance the miscella. The enhanced miscella is then sequentially removed from each basket through a screen in the lower portion thereof and dropped into a second stage of stationary baskets wherein each basket therein is in vertical alignment with a corresponding basket in the first stage.

Miscella is then introduced into the material in the baskets in the second stage and passes downwardly through the material being processed to further enhance the miscella. The miscella from each of the second stage baskets then passes through a screen in the lower portion thereof and, again, the material being processed is sequentially dumped into further baskets in at least one further stage of stationary baskets wherein the treatment steps are again repeated until a last of these further stages is reached.

Thereupon, solvent is introduced into the baskets of the last stage to produce miscella. This miscella in the last stage is then introduced into a previous stage to further enhance it, and subsequently each stage above the previous stage until the fully enhanced miscella is removed from the uppermost stage. The processed material in the last stage is then dropped through the screens in the bottom thereof into a collection device for removal and possible subsequent processing.

In the preferred form of the process of the present invention, the screens beneath each of the stages are rotated and contain an opening through which each successive basket is opened to the basket in the subsequent stage in alignment therewith so that the material being processed can be sequentially dropped from stage to stage in a vertical path after it has been treated with miscella or solvent in each stage.

DETAILED DESCRIPTION OF THE PREFERRED EMBODIMENT

Figure 1:
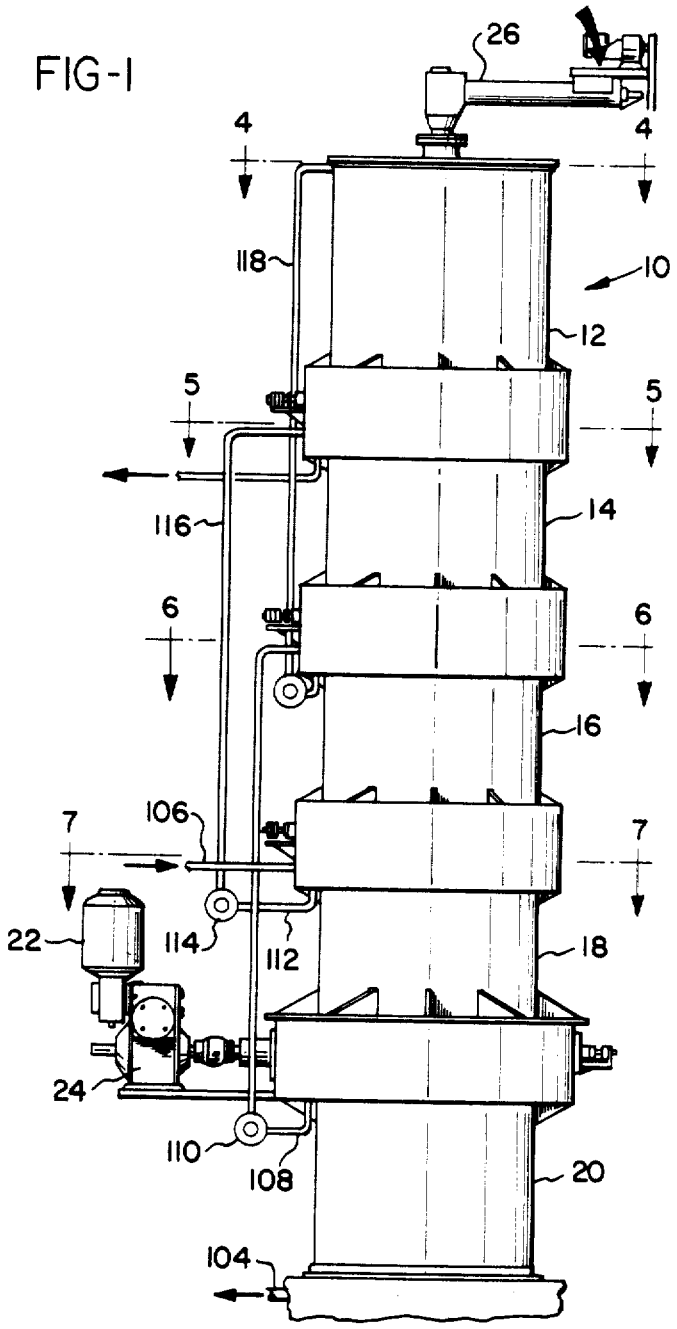
FIG. 1 is an elevational view of the preferred embodiment of the present invention.

In the preferred embodiment of the present invention as illustrated in FIG. 1, the multiple-stage extractor 10 is provided with four processing sections or stages indicated generally as stages 12, 14, 16 and 18, although the number of the stages can be varied in accordance with the desired volume flow and depth of material to be processed. Beneath the last stage 18 is the processed material removal stage 20 from which the slurry of flakes or other material which has been sequentially processed through each of the prior stages, is removed for subsequent processing for disposal.

A single drive motor 22 drives all of the rotating apparatus in each of the stages through a gear reduction device 24, as described more fully below. The material to be processed is introduced through a feed screw conveyor 26 where it is introduced into the upper region of the first extractor section 12.

Figure 2:
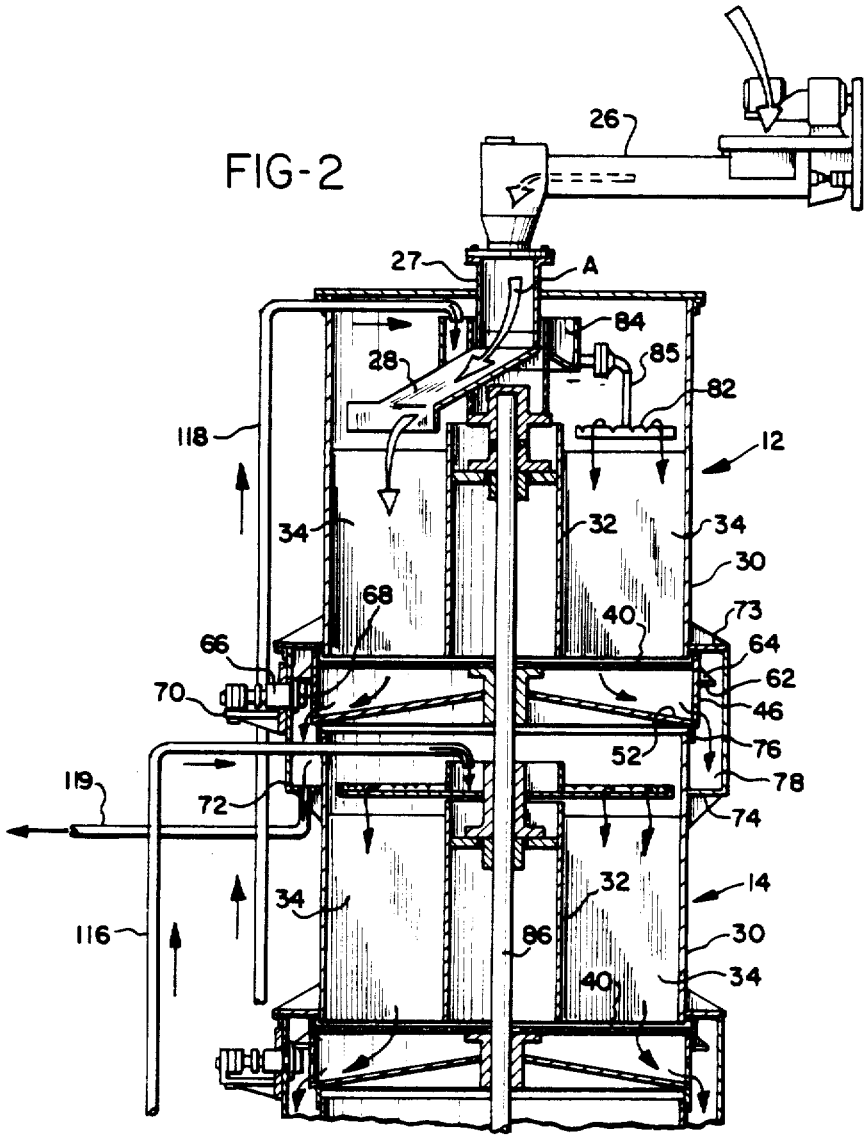
FIG. 2 is a vertical cross-sectional view of the upper two stages of the embodiment of FIG. 1.

Referring now to FIG. 2, the large arrows A indicate the direction of flow of the material to be processed as it is introduced through the feed screw conveyor 26 and through a cylindrical spout 27 onto a trough 28 which uniformly distributes the material in each of the baskets in the first section 12 as the trough 28 is rotated in a circular path above the baskets. Each of the extractor sections or stages is constructed essentially the same, with a cylindrical wall 30 forming the main outer housing of the apparatus, and an inner cylindrical concentric wall 32. Between these walls extend a plurality of vertically disposed radially extending partitions 34 which form the plurality of bottomless baskets therebetween.

Figure 4:
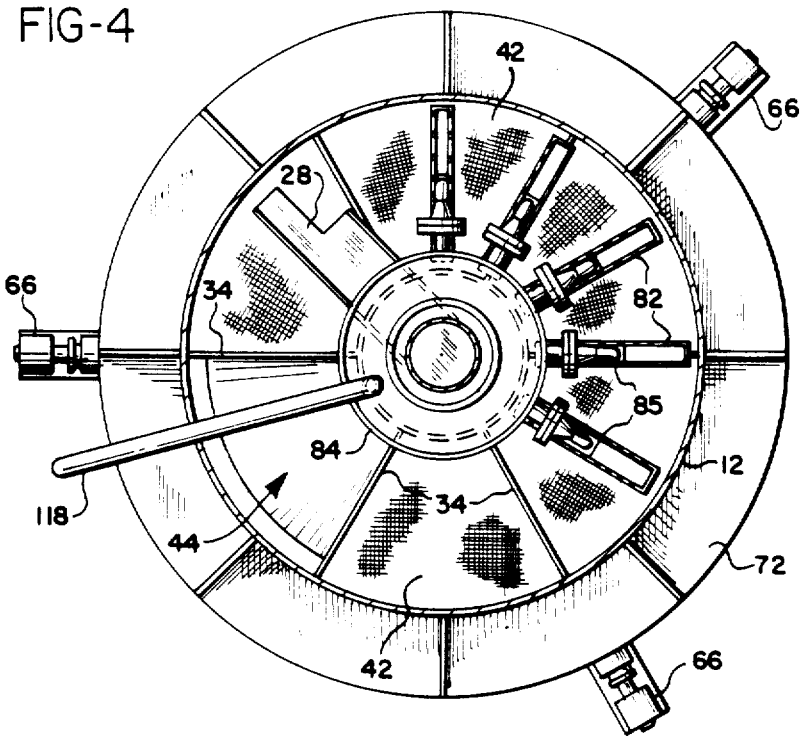
FIG. 4 is a horizontal cross-sectional view along the line 4—4 of FIG. 1, showing the miscella distribution system and material distribution trough in the first stage.

Immediately beneath the concentric cylindrical walls 30 and 32, is a disc-shaped screen assembly 40 formed of a plurality of pie-shaped screen segments 42, as shown in FIG. 4, for example, with an opening 44 approximately [the extent of the bottoms of two of the baskets] *coextensive with the bottom of a basket* formed by the partitions 34. This permits the material being processed to be passed from one extractor section to another sequentially from each basket. Each screen assembly 40 is supported in the upper region of a cylindrical wall 46 which forms the outer wall of the miscella collection pan 50. The bottom of the collection pan 50 is formed by a conically-shaped downwardly and outwardly extending disc 52 which joins the bottom edge of cylindrical wall 46.

Figure 8:
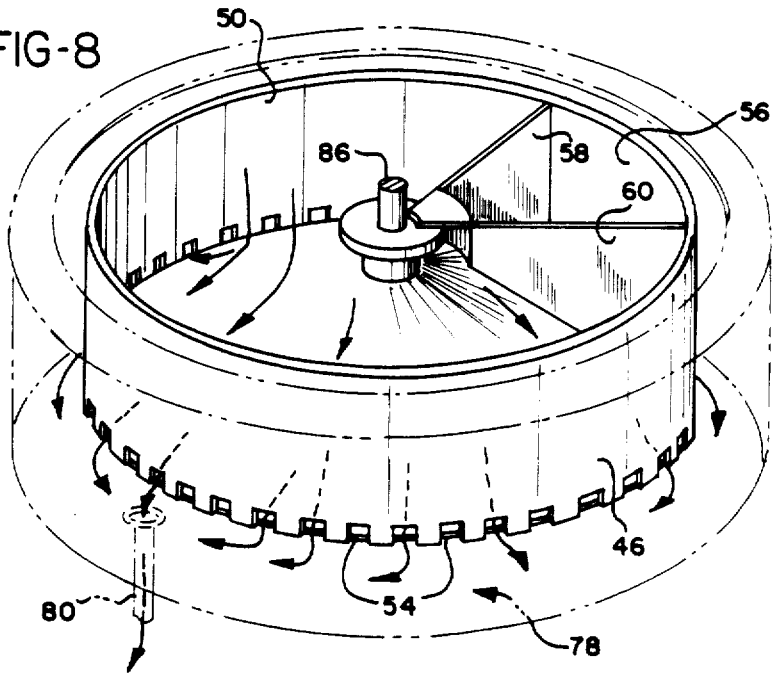
FIG. 8 is a pictorial illustration of a collection pan exemplary of the collection pan in each of the stages of the embodiment of FIG. 1.

As best seen in FIG. 8, a plurality of small openings 54 are provided around the outer periphery of the collection pan 50 to permit the miscella to drain out of the collection pan and enter the miscella distribution system as described below. A hopper 56 is formed in each of the miscella collection pans 50 by providing two vertically extending partitions 58 and 60 which extend from a central region of the pan outwardly to meet the cylindrical wall 46 to provide the pie-shaped opening of the hopper 56.

Figure 3:
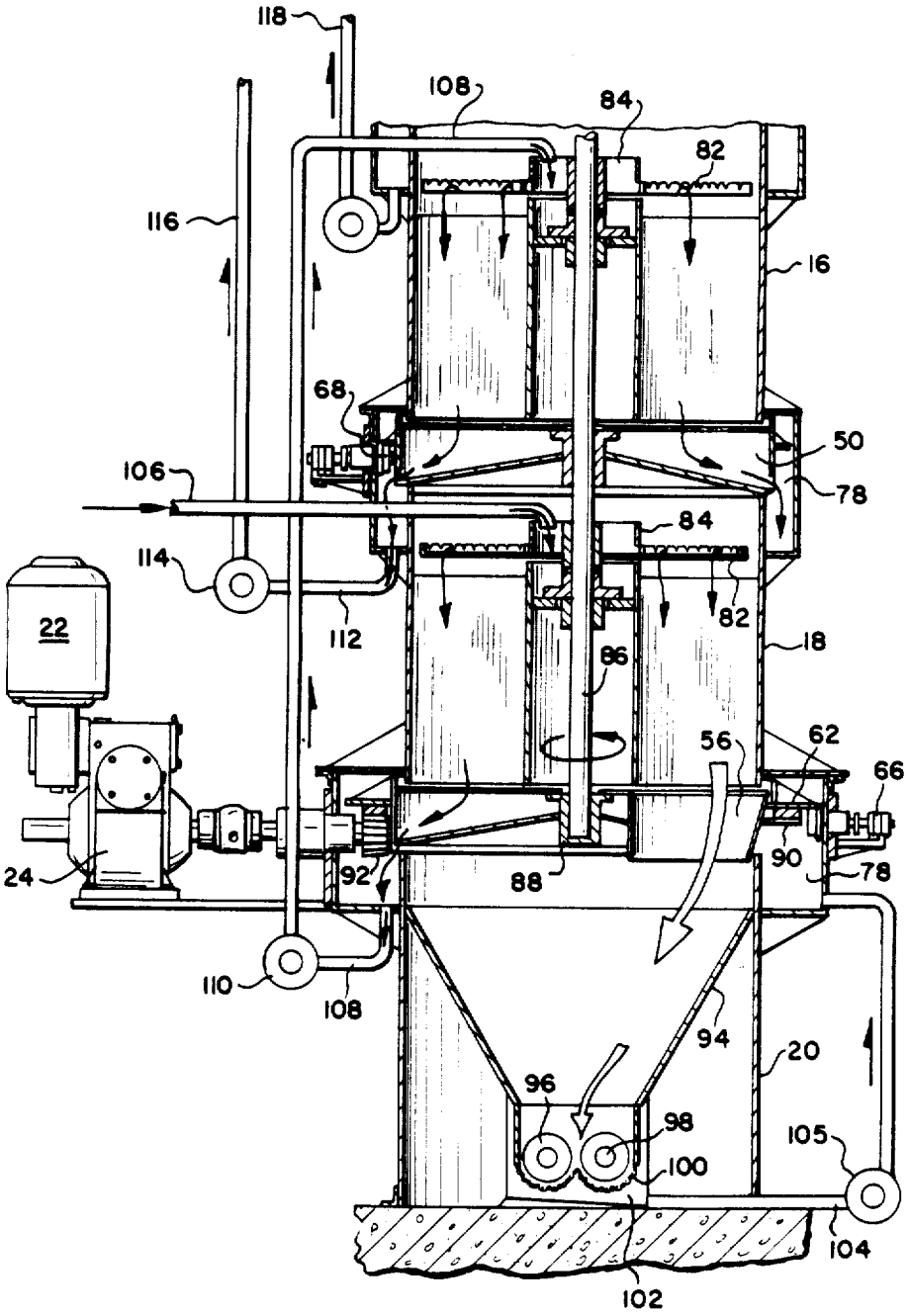
FIG. 3 is a vertical cross-sectional view of the lower two stages and material removal system of the embodiment of FIG. 1.

The bottom 52 of the pan 50 is interrupted at that point and the partitions 58 and 60 extend downwardly through the bottom of the pan, as best seen in FIG. 3, so that a trough is formed to direct the material being processed either into the subsequent basket, or into the material removal section 20 in the case of the last stage. It is to be noted that the hoppers 56 in the sections other than section 18 are not seen in FIG. 2 since in the relative positions of the hoppers of the various sections, as shown by FIGS. 4 through 7, the hopper is in front of the section lines.

Referring again to FIG. 2, an annular ring 62 is welded to the outside of cylindrical wall 46 and is provided with a plurality of stiffening webs 64. The annular ring 62 supports the miscella collection pan 50 and screen assembly 40 around the outer periphery of the pan. A plurality of roller assemblies 66 are mounted at equally angularly spaced locations around the outer periphery of the apparatus with the annular ring 62 riding on the rollers 68 thereof. The support roller assemblies 66 are each mounted to a support plate 70 which, in turn, is welded to the side of a cylindrical wall 72 which extends completely around the juncture of adjacent extractor sections. This juncture area is enclosed by upper and lower annular rings 73 and 74, which are welded on their inside edges to the cylindrical walls 30 of the respective extractor section and welded at their outside edges to wall 72.

A cylindrical ring 76 is welded to and depends downwardly from the bottom 52 of miscella collection pan 50 and closely surrounds the upper edge of the cylindrical wall 30 of the next lower extractor section in order to prevent the miscella or material being processed from passing through the gap which would otherwise exist in this area.

A collection trough 78 is formed by the cylindrical wall 72 and annular ring 74 in the lower region of each of the extractor sections and receives miscella from the plurality of openings 54 defined in the lower portion of the collection pan 50. Miscella distribution pipes connect to the bottom of each of the troughs 78 which, for each extractor section, distributes the miscella to either a preceeding extractor section or to a collection tank when the miscella is completely enhanced, as is explained more fully below.

The miscella or solvent is distributed over the upper portion of the baskets in each extractor section by a plurality of miscella distribution troughs 92 which extend radially outwardly at predetermined angular locations from a central cylindrical trough 84, as seen for each section in FIGS. 4 through 7. It is to be noted that the miscella distribution system for the first extractor section 12 is somewhat different in that the troughs 82 are connected to the central cylindrical trough 84 through interconnecting pipes 85 which also support the troughs 82. In the other sections, the troughs 82 are directly connected to the central cylindrical trough 84 as shown.

All of the miscella distribution troughs, screen assemblies 40 and miscella collection pans 50 are mounted to a central shaft 86 for rotation therewith. In addition, the material distribution trough 28 is also mounted to the upper end of shaft 86 for rotation therewith. The lower end of shaft 86 is supported in a hub 88, as shown in FIG. 3, which additionally supports the collection pan 50 and screen assembly 40 of the last extractor section 18. In this last section, the miscella collection trough 78 formed by the cylindrical wall 72 and upper and lower annular rings 73 and 74, is somewhat expanded in order to accommodate a ring gear 90 which is supported by an also expanded annular ring 62, for rotation therewith. The gear reduction unit 24 and motor 22 then, through a pinion gear 92, rotates the ring gear 90 which thus simultaneously rotates all of the miscella distribution troughs, screen assemblies and miscella collection pan.

Referring now to the material removal stage 20, the hopper 56 in the last extractor stage 18 empties directly into a conical chute 94 which directs the material towards a horizontally extending pair of miscella extraction screws 96 and 98 which convey the material out of the apparatus. In doing so, however, the extraction screws 96 and 98 are so designed and positioned that they tend to squeeze the material to thus remove further miscella therefrom. This miscella passes through the screen surface 100 beneath the screws and is collected in a further collection trough 102 from which it is removed by a miscella distribution pipe 104 and pumped by pump 105 into miscella collection trough 78 of the last stage 18. Thus, additional miscella is removed from the material than would otherwise be the case if it were dumped into the hopper and simply removed. It is contemplated that other means may be utilized for removal of the material from beneath the conical chute 94, such as a single feed screw or mechanical picker.

Referring now to the miscella collection and distribution system, as shown in FIGS. 2 and 3, the pure solvent, such as hexane, is introduced through a pipe 106 into the miscella distribution trough 84 from which it then passes into the individual miscella distribution troughs 82. As the troughs 82 overfill, the miscella cascades over the sides of the troughs and is thus applied to the upper surface of the material being processed in each of the baskets as the troughs 82 are rotated by the shaft 86.

As the thus applied solvent passes through the material, it extracts the oil or other soluble substances therefrom and passes through the screen assembly 40 beneath the bottom of the baskets and is collected in the collection pan 50. It then passes through the openings 54 in the bottom of the collection pan 50 and enters the cylindrical collection trough 78 beneath the last stage extractor 18. From there it passes into the pipe 108 and is pumped by pump 110 up to the upper region of the previous extraction stage 16 where it is introduced into the cylindrical miscella distribution trough 84 and hence through the troughs 82 onto the material in the baskets. This miscella, as it passes through the material in the baskets is again further enhanced and collected in the collection pan 50 where, as before, it passes into the collection trough 78.

This now enhanced miscella is taken through the pipe 112 and pumped by pump 114 up to the next previous stage, as shown in FIG. 2, through pipe 116 and is introduced into the upper region of extractor stage 14 through the central cylindrical miscella distribution trough 84 and the individual distribution troughs 82. As before, it passes through the beds of material and becomes further enhanced and is then subsequently pumped to the first stage through pipe 118 and distributed over the material as before. The miscella from the first stage is then removed to a distillation system (not shown) through pipe 119.

The sections of the device shown in FIGS. 4 through 7 show that each of the sets of miscella distribution troughs 82 are in a specific relationship relative to those in the other stages, which is important in processing material through the apparatus of the present invention. As shown in FIG. 4, the five miscella distribution troughs 82 are positioned at equal angular locations behind the material distribution trough in the direction of rotation, which is counterclockwise as viewed. Likewise, the screen assemblies 40 and the openings 44 therein are in a specific relation between the various stages, with the opening 44 being in advance of the material distribution trough in the first stage and being in the other stages in advance of the opening in the subsequent immediately following stage.

As material is being introduced through the material distribution trough into a basket, as illustrated in FIG. 4 in the first stage, the previously filled baskets are being treated with the previously enhanced miscella. The last distribution trough 82 is somewhat in advance of the opening 44 in the screen so as to permit the miscella to drain through the material being processed before the opening 44 allows the material to pass into the basket in the subsequent stage positioned immediately below the basket being emptied. When the opening 44 in the first stage screen assembly is positioned as illustrated in FIG. 4, the opening 44 in the screen assembly of the second stage is positioned as illustrated in FIG. 5 so that the screen in the second section will cover the bottom of the basket in which the material being processed is received from the first extractor section.

Figure 5:
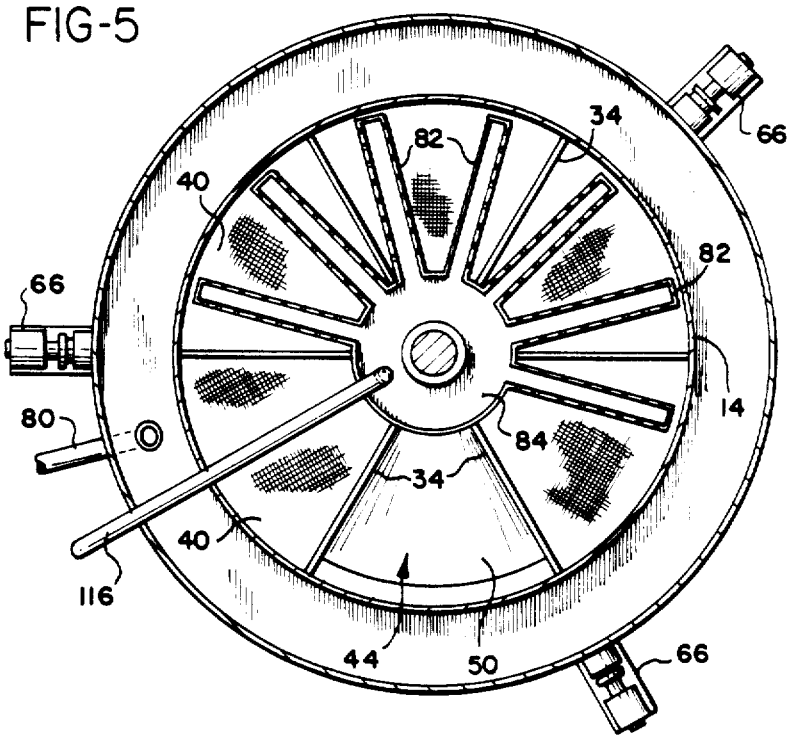
FIG. 5 is a horizontal cross-sectional view along the line 5—5 of FIG. 1, illustrating the miscella distribution system for the second stage.
Figure 6:
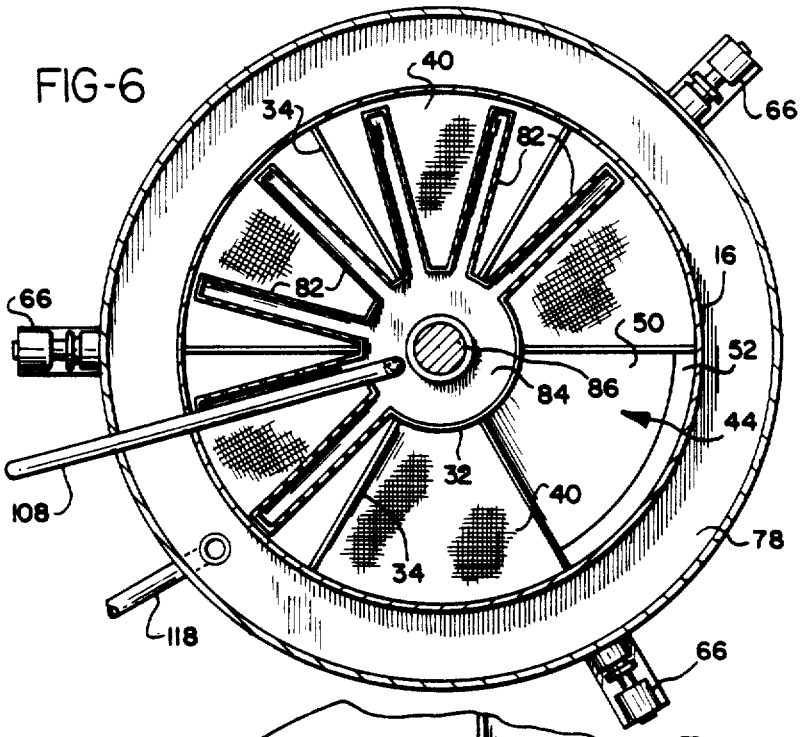
FIG. 6 is a horizontal cross-sectional view along the line 6—6 of FIG. 1, showing the miscella distribution system for the third stage.
Figure 7:
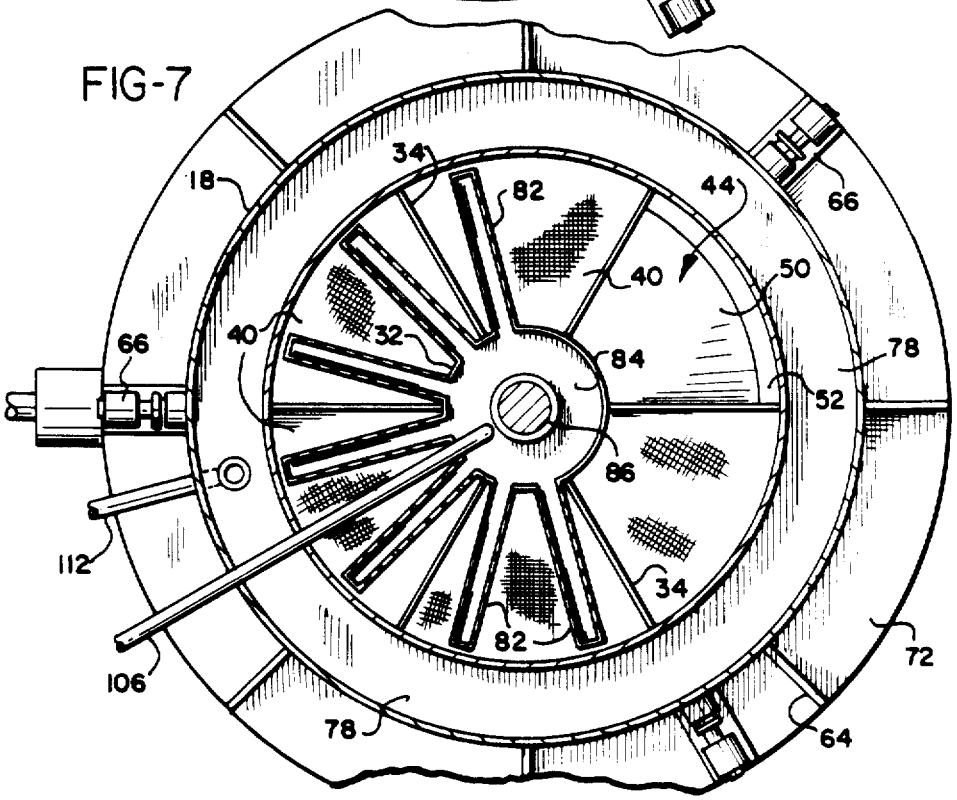
FIG. 7 is a horizontal cross-sectional view along the line 7—7 of FIG. 1, illustrating the miscella distribution system of the fourth stage.

It is also to be noted that the troughs 82 in FIG. 5 have not yet reached the position where the material is being passed from the first stage to the second, in order that it does not interfere with the passage of the material. Also, it is to be noted that the opening in the screen of the second stage immediately precedes, in the direction of rotation, the opening in the screen of the first stage so that the material in the second stage is being dumped just prior to new material being received from the first stage. All subsequent stages are similarly aligned in regard to the openings 44 in the screen assemblies as well as the positioning of the miscella distribution troughs 82, so that material is fully processed and the miscella removed through each cycle of rotation of the miscella distribution trough, material distribution trough and screen assemblies.

It is to be noted that the hoppers 56 in each of the collection pans 50 remain in alignment with the openings 44 in each of the screen assemblies in order to permit the material to be passed from one basket to a subsequent one in vertical registry therewith.

While the process and apparatus herein described constitutes a preferred embodiment of the invention, it is to be understood that the invention is not limited thereby and that changes may be made therein without departing from the scope of the invention.

What is claimed is:

1. In a continuous solvent extracting apparatus, having a cylindrical housing, material distribution means in an upper portion of said housing, a plurality of vertically stacked extractor sections each including a plurality of vertically disposed radially extending walls for receiving material therebetween from said material distribution means, screening means beneath said walls for retaining processed material in a section and passing miscella therethrough, a collecting pan associated with and beneath each screening means for collecting miscella passed therethrough, miscella distribution means for removing miscella from said pans and supplying miscella to an upper portion of each section and material removal means for removing material from a lowermost extractor section, wherein the improvement comprises:

said plurality of walls are stationary and abut said housing with each adjacent pair of walls and said housing forming a basket with said baskets in each section being in registry with said baskets in all other sections;

each said screening means being horizontally disposed, disc-shaped, mounted for rotation and having an opening defined therein generally co-extensive with a basket when in registry therewith;

each said pan having an opening defined therein in alignment with said opening defined in said associated screening mean for passing material from a basket of one section to a basket of a subsequent section and mounted for rotation with said associated screening means; and means for rotating each said associated screening means and said pan simultaneously.

2. The improvement of claim 1 wherein said means for rotating said screening means and pans includes means interconnecting all of said screening means and pans of all of said sections for simultaneous rotation thereof.

3. A continuous solvent extracting apparatus comprising:

a cylindrical vertically extending housing;

a plurality of vertically stacked extractor sections disposed within said housing each section having (a) a plurality of vertically disposed radially extending stationary walls extending outwardly and abutting said housing with adjacent pairs of walls and the housing each defining a basket, (b) a horizontally disposed disc-shaped screen having an opening defined therein generally co-extensive with a basket when in registry therewith and mounted for rotation beneath said walls, (c) a miscella collecting pan disposed beneath said screen and having a hopper defined therein extending toward a top portion of a subsequent extractor section and in alignment with said opening in said screen for passing material vertically downward from a basket of one section to a basket of the subsequent section, (d) means for simultaneously rotating said screen and said pan;

a material [collecting] *removal* means disposed beneath a lowermost extractor section for removing material from the apparatus after it has passed therethrough;

a miscella distribution means for conveying miscella from said pan of an extractor section to a top portion of a previous extractor section above the one from which removed, and for removing miscella from an uppermost extractor section for distribution to a remote location; and means above said lowermost extractor section for supplying solvent to a top portion thereof.

4. Apparatus as defined in claim 3 wherein said material [collection] *removal* means includes means for further extracting miscella from material being processed.

5. Apparatus as defined in claim 4 wherein said [further extraction] *material removal* means includes *means for* returning the miscella thus extracted to said [uppermost] *lowermost* extractor section for mixing with miscella from that section.

6. Apparatus as defined in claim 4 [or 5] wherein said [further extraction] *material removal* means includes:

a funnel-shaped housing extending downward from said lowermost extractor section;

a pair of horizontally extending intermeshing screw flights disposed beneath said funnel-shaped housing and co-operating to expel processed material from the apparatus;

a further screen disposed beneath said screw flights through which miscella can pass; and a [miscella receiving means] *collection trough* disposed beneath said further screen for receiving miscella therefrom.

7. Apparatus as defined in claim 3 wherein said means for rotating said screens and said pans includes means interconnecting all of said screens and pans in all of said sections for simultaneous rotation thereof.

*8. An apparatus as defined in claim 5 wherein said material removal means includes:*

*a funnel-shaped housing extending downward from said lowermost extractor section;*

*a pair of horizontally extending intermeshing screw flights disposed beneath said funnel-shaped housing and co-operating to expel processed material from the apparatus;*

*a further screen disposed beneath said screw flights through which miscella can pass; and*

*a collection trough disposed beneath said further screen for receiving miscella therefrom.*

* * * * *